(12) United States Patent
Dowling et al.

(10) Patent No.: US 7,248,239 B2
(45) Date of Patent: Jul. 24, 2007

(54) SYSTEMS AND METHODS FOR COLOR CHANGING DEVICE AND ENCLOSURE

(75) Inventors: Kevin J. Dowling, Westford, MA (US); George G. Mueller, Boston, MA (US); Ihor A. Lys, Boston, MA (US)

(73) Assignee: Color Kinetics Incorporated, Boston, MA (US)

( * ) Notice: Subject to any disclaimer, the term of this patent is extended or adjusted under 35 U.S.C. 154(b) by 0 days.

(21) Appl. No.: 10/913,144

(22) Filed: Aug. 6, 2004

(65) Prior Publication Data

US 2005/0047132 A1 Mar. 3, 2005
US 2006/0050509 A9 Mar. 9, 2006

Related U.S. Application Data

(63) Continuation of application No. 09/917,246, filed on Jul. 27, 2001, now Pat. No. 6,888,322, and a continuation-in-part of application No. 09/215,624, filed on Dec. 17, 1998, now Pat. No. 6,528,954, said application No. 09/917,246 and a continuation-in-part of application No. 09/742,017, filed on Dec. 20, 2000, now abandoned, and a continuation-in-part of application No. 09/333,739, filed on Jun. 15, 1999, is a continuation-in-part of application No. 09/213,607, filed on Dec. 17, 1998, now abandoned, and a continuation-in-part of application No. 09/213,189, filed on Dec. 17, 1998, now Pat. No. 6,459,919, and a continuation-in-part of application No. 09/213,581, filed on Dec. 17, 1998, now Pat. No. 7,038,398, and a continuation-in-part of application No. 09/213,540, filed on Dec. 17, 1998, now Pat. No. 6,720,745, which is a continuation of application No. 09/213, 548, filed on Dec. 17, 1998, now Pat. No. 6,166,496, said application No. 09/917,246 is a continuation-in-part of application No. 09/815,418, filed on Mar. 22, 2001, now Pat. No. 6,577,080, said application No. 09/917,246 is a continuation-in-part of application No. 09/626,905, filed on Jul. 27, 2000, now Pat. No. 6,340,868, which is a continuation of application No. 09/213,659, filed on Dec. 17, 1998, now Pat. No. 6,211,626, application No. 10/913,144, which is a continuation-in-part of application No. 09/805,368, filed on Mar. 13, 2001, now Pat. No. 7,186,003.

(60) Provisional application No. 60/221,579, filed on Jul. 28, 2000, provisional application No. 60/211,417, filed on Jun. 14, 2000, provisional application No. 60/199,333, filed on Apr. 24, 2000, provisional application No. 60/090,920, filed on Jun. 26, 1998, provisional application No. 60/079,285, filed on Mar. 25, 1998, provisional application No. 60/078,861, filed on Mar. 20, 1998, provisional application No. 60/068, 792, filed on Dec. 24, 1997, provisional application No. 60/071,281, filed on Dec. 17, 1997.

(51) Int. Cl.
*G09G 3/32* (2006.01)

(52) U.S. Cl. .................. 345/83; 345/84; 345/169; 345/661; 362/85; 362/227; 315/169.3; 315/312; 315/362

(58) Field of Classification Search ............. 315/169.3, 315/292–294, 297, 307, 312–316, 362, 291, 315/300, 308, 169.1; 362/84, 227, 231, 234, 362/251, 311, 341, 800, 85; 313/510–513, 313/503; 345/42–46, 51, 214, 173, 175, 345/176, 183, 82–84, 168–170, 661, 905; 340/815.45, 815.49, 815.56, 815.65, 815.66
See application file for complete search history.

(56) References Cited

U.S. PATENT DOCUMENTS

| | | |
|---|---|---|
| 3,561,719 A | 2/1971 | Grindle |
| 3,643,088 A | 2/1972 | Osteen et al. |
| 3,746,918 A | 7/1973 | Drucker et al. |
| 3,832,503 A | 8/1974 | Crane |
| 3,858,086 A | 12/1974 | Anderson et al. |
| 3,909,670 A | 9/1975 | Wakamatsu et al. |
| 3,924,120 A | 12/1975 | Cox, III |
| 3,958,885 A | 5/1976 | Stockinger et al. |

| | | | | | | |
|---|---|---|---|---|---|---|
| 3,974,637 | A | 8/1976 | Bergey et al. | 5,339,213 A | 8/1994 | O'Callaghan |
| 4,001,571 | A | 1/1977 | Martin | 5,350,977 A | 9/1994 | Hamamoto et al. |
| 4,054,814 | A | 10/1977 | Fegley et al. | 5,357,170 A | 10/1994 | Luchaco et al. |
| 4,082,395 | A | 4/1978 | Donato et al. | 5,371,618 A | 12/1994 | Tai et al. |
| 4,096,349 | A | 6/1978 | Donato | 5,374,876 A | 12/1994 | Horibata et al. |
| 4,241,295 | A | 12/1980 | Williams, Jr. | 5,387,901 A | 2/1995 | Hardt |
| 4,272,689 | A | 6/1981 | Crosby et al. | 5,388,357 A | 2/1995 | Malita |
| 4,273,999 | A | 6/1981 | Pierpoint | 5,404,282 A | 4/1995 | Klinke et al. |
| 4,277,665 | A | 7/1981 | Kondo et al. | 5,406,176 A | 4/1995 | Sugden |
| 4,298,869 | A | 11/1981 | Okuno | 5,406,729 A | 4/1995 | Bejin |
| 4,329,625 | A | 5/1982 | Nishizawa et al. | 5,410,328 A | 4/1995 | Yoksza et al. |
| 4,367,464 | A | 1/1983 | Kurahashi et al. | 5,412,284 A | 5/1995 | Moore et al. |
| 4,388,567 | A | 6/1983 | Yamazaki et al. | 5,420,482 A | 5/1995 | Phares |
| 4,388,589 | A | 6/1983 | Molldrem, Jr. | 5,422,751 A | 6/1995 | Lewis et al. |
| 4,392,187 | A | 7/1983 | Bornhorst | 5,432,408 A | 7/1995 | Matsuda et al. |
| 4,420,711 | A | 12/1983 | Takahashi et al. | 5,436,535 A | 7/1995 | Yang |
| 4,500,796 | A | 2/1985 | Quin | 5,463,280 A | 10/1995 | Johnson |
| 4,600,976 | A * | 7/1986 | Callahan ................ 362/277 | 5,465,144 A | 11/1995 | Parker et al. |
| 4,625,152 | A | 11/1986 | Nakai | 5,489,827 A | 2/1996 | Xia |
| 4,647,217 | A | 3/1987 | Havel | 5,491,402 A | 2/1996 | Small |
| 4,656,398 | A | 4/1987 | Michael et al. | 5,504,395 A | 4/1996 | Johnson et al. |
| 4,668,895 | A | 5/1987 | Schneiter | 5,515,244 A | 5/1996 | Levins et al. |
| 4,682,079 | A | 7/1987 | Sanders et al. | 5,545,950 A | 8/1996 | Cho |
| 4,686,425 | A | 8/1987 | Havel | 5,561,346 A | 10/1996 | Byrne |
| 4,687,340 | A | 8/1987 | Havel | 5,575,459 A | 11/1996 | Anderson |
| 4,688,154 | A | 8/1987 | Nilssen | 5,575,554 A | 11/1996 | Guritz |
| 4,688,869 | A | 8/1987 | Kelly | 5,592,051 A | 1/1997 | Korkala |
| 4,695,769 | A | 9/1987 | Schweickardt | 5,615,945 A | 4/1997 | Tseng |
| 4,701,669 | A | 10/1987 | Head et al. | 5,640,061 A | 6/1997 | Bornhorst et al. |
| 4,705,406 | A | 11/1987 | Havel | 5,689,400 A | 11/1997 | Ohgami et al. |
| 4,707,141 | A | 11/1987 | Havel | 5,701,058 A | 12/1997 | Roth |
| 4,727,289 | A | 2/1988 | Uchida | 5,721,471 A | 2/1998 | Begemann et al. |
| 4,740,882 | A | 4/1988 | Miller | 5,742,120 A | 4/1998 | Lin |
| 4,771,274 | A | 9/1988 | Havel | 5,751,118 A | 5/1998 | Mortimer |
| 4,780,621 | A | 10/1988 | Bartleucci et al. | 5,752,766 A | 5/1998 | Bailey et al. |
| 4,818,072 | A | 4/1989 | Mohebban | 5,769,527 A | 6/1998 | Taylor et al. |
| 4,837,565 | A | 6/1989 | White | 5,774,098 A | 6/1998 | Kawashima et al. .......... 345/83 |
| 4,845,481 | A | 7/1989 | Havel | 5,803,579 A | 9/1998 | Turnbull et al. |
| 4,845,745 | A | 7/1989 | Havel | 5,808,689 A | 9/1998 | Small |
| 4,863,223 | A | 9/1989 | Weissenbach et al. | 5,821,695 A | 10/1998 | Vilanilam et al. |
| 4,874,320 | A | 10/1989 | Freed et al. | 5,838,226 A * | 11/1998 | Houggy et al. ........ 340/310.11 |
| 4,887,074 | A | 12/1989 | Simon et al. | 5,850,214 A * | 12/1998 | McNally et al. ............. 345/173 |
| 4,922,154 | A | 5/1990 | Cacoub | 5,852,658 A | 12/1998 | Knight et al. |
| 4,934,852 | A | 6/1990 | Havel | RE36,030 E | 1/1999 | Nadeau |
| 4,962,687 | A * | 10/1990 | Belliveau et al. ......... 84/464 R | 5,859,508 A | 1/1999 | Ge et al. |
| 4,965,561 | A | 10/1990 | Havel | 5,896,010 A | 4/1999 | Mikolajczak et al. |
| 4,973,835 | A | 11/1990 | Kurosu et al. | 5,911,003 A * | 6/1999 | Sones ........................ 382/162 |
| 4,980,806 | A | 12/1990 | Taylor et al. | 5,912,653 A | 6/1999 | Fitch |
| 4,992,704 | A | 2/1991 | Stinson | 5,914,709 A | 6/1999 | Graham et al. |
| 5,003,227 | A | 3/1991 | Nilssen | 5,924,784 A | 7/1999 | Chliwnyj et al. |
| 5,008,595 | A | 4/1991 | Kazar | 5,938,772 A | 8/1999 | Welch ........................ 713/320 |
| 5,027,262 | A | 6/1991 | Freed | 5,946,209 A | 8/1999 | Eckel et al. |
| 5,034,807 | A | 7/1991 | Von Kohorn | 5,952,680 A | 9/1999 | Strite |
| 5,083,063 | A | 1/1992 | Brooks | 5,959,547 A | 9/1999 | Tubel et al. |
| 5,126,634 | A | 6/1992 | Johnson | 5,963,185 A | 10/1999 | Havel |
| 5,128,595 | A | 7/1992 | Hara | 5,974,553 A | 10/1999 | Gandar |
| 5,134,387 | A | 7/1992 | Smith et al. | 6,016,038 A | 1/2000 | Mueller et al. |
| 5,142,199 | A | 8/1992 | Elwell | 6,018,237 A | 1/2000 | Havel |
| 5,154,641 | A | 10/1992 | McLaughlin | 6,018,332 A | 1/2000 | Nason et al. ................ 345/661 |
| 5,164,715 | A | 11/1992 | Kashiwabara et al. | 6,030,088 A | 2/2000 | Scheinberg |
| 5,165,778 | A | 11/1992 | Matthias ................ 362/101 | 6,030,108 A * | 2/2000 | Ishiharada et al. .......... 362/562 |
| 5,184,114 | A | 2/1993 | Brown | 6,058,634 A | 5/2000 | McSpiritt |
| 5,194,854 | A | 3/1993 | Havel | 6,072,280 A | 6/2000 | Allen |
| 5,209,560 | A | 5/1993 | Taylor et al. | 6,082,867 A * | 7/2000 | Chien ......................... 362/84 |
| 5,225,765 | A | 7/1993 | Callahan et al. | 6,089,893 A | 7/2000 | Yu et al. |
| 5,226,723 | A | 7/1993 | Chen | 6,109,760 A | 8/2000 | Salatrik et al. |
| 5,254,910 | A | 10/1993 | Yang | 6,132,072 A | 10/2000 | Turnbull et al. |
| 5,256,948 | A | 10/1993 | Boldin et al. | 6,135,604 A | 10/2000 | Lin |
| 5,282,121 | A | 1/1994 | Bornhorst et al. | 6,137,487 A * | 10/2000 | Mantha ....................... 715/767 |
| 5,294,865 | A | 3/1994 | Haraden | 6,150,774 A | 11/2000 | Mueller et al. |
| 5,305,013 | A | 4/1994 | Daniels | 6,161,944 A | 12/2000 | Leman |
| D348,905 | S | 7/1994 | Smid | 6,166,496 A | 12/2000 | Lys et al. |
| 5,329,431 | A | 7/1994 | Taylor et al. | 6,183,086 B1 | 2/2001 | Neubert |

| | | |
|---|---|---|
| 6,184,628 B1 | 2/2001 | Ruthenberg |
| 6,190,017 B1 | 2/2001 | Lai |
| 6,196,471 B1 | 3/2001 | Ruthenberg |
| 6,211,626 B1 | 4/2001 | Lys et al. |
| 6,215,409 B1 | 4/2001 | Blach |
| 6,217,182 B1 | 4/2001 | Shepherd et al. |
| 6,224,244 B1 | 5/2001 | Burys |
| 6,250,774 B1 | 6/2001 | Begemann et al. |
| 6,270,229 B1 * | 8/2001 | Chien ................. 362/84 |
| 6,285,420 B1 | 9/2001 | Mizumo et al. |
| 6,289,466 B1 | 9/2001 | Bayramoglu et al. ....... 713/310 |
| 6,292,901 B1 | 9/2001 | Lys et al. |
| 6,340,868 B1 | 1/2002 | Lys et al. |
| 6,357,887 B1 | 3/2002 | Novak |
| 6,361,186 B1 | 3/2002 | Slayden |
| 6,476,726 B1 | 11/2002 | Pederson ............... 340/815.45 |
| 6,486,873 B1 | 11/2002 | McDonough et al. ....... 345/163 |
| 6,492,908 B1 | 12/2002 | Cheng .................. 340/815.73 |
| 6,494,593 B2 | 12/2002 | An et al. ................... 362/249 |
| 6,568,834 B1 | 5/2003 | Scianna |
| 6,608,996 B1 | 8/2003 | Laurikka et al. ........... 340/7.55 |
| 7,113,196 B2 * | 9/2006 | Kerr .......................... 315/292 |
| 2001/0033488 A1 | 10/2001 | Chliwnyi et al. |
| 2002/0190975 A1 | 12/2002 | Kerr |
| 2003/0002246 A1 | 1/2003 | Kerr |
| 2003/0161093 A1 | 8/2003 | Lam et al. |
| 2004/0156192 A1 | 8/2004 | Kerr et al. |
| 2005/0122292 A1 | 6/2005 | Schmitz et al. ............... 345/83 |

FOREIGN PATENT DOCUMENTS

| | | |
|---|---|---|
| AU | 6 267 9 | 12/1996 |
| CA | 2 178 432 | 12/1996 |
| DE | 101 37 919 A1 | 6/2002 |
| EP | 0 564 127 A2 | 10/1993 |
| EP | 0564127 A2 | 10/1993 |
| EP | 0534710 B1 | 1/1996 |
| EP | 0752632 A2 | 1/1997 |
| EP | 0752632 A3 | 8/1997 |
| EP | 1020352 A2 | 7/2000 |
| EP | 1113215 A2 | 7/2001 |
| FR | 88 17359 | 12/1998 |
| GB | 2176042 A | 12/1986 |
| JP | 06043830 | 2/1994 |
| JP | 8-106264 | 4/1996 |
| JP | 9 320766 | 12/1997 |
| JP | 2001147739 | 5/2001 |
| WO | WO 89/05086 | 6/1989 |
| WO | WO 94/18809 | 8/1994 |
| WO | WO 95/13498 | 5/1995 |
| WO | WO 96/41098 | 12/1996 |
| WO | WO 00/28510 | 5/2000 |

OTHER PUBLICATIONS

"LM117/LM317A/LM317 3-Terminal Adjustable Regulator", National Semiconductor Corporation, May 1997, pp. 1-20.
"DS96177 RS-485 / RS-422 Differential Bus Repeater", National Semiconductor Corporation, Feb. 1996, pp. 1-8.
"DS2003 / DA9667 / DS2004 High Current / Voltage Darlington Drivers", National Semiconductor Corporation, Dec. 1995, pp. 1-8.
"LM140A / LM140 / LM340A / LM7800C Series 3—Terminal Positive Regulators", National Semiconductor Corporation, Jan. 1995, pp. 1-14.

High End Systems, Inc., Trackspot User Manual, Aug. 1997, Excerpts (Cover, Title page, pp. ii through iii and 2-13 through 2-14).
Artistic License, AL4000 DMX512 Processors, Revision 3.4, Jun. 2000, Excerpts (Cover, pp. 7,92 through 102).
Artistic License, Miscellaneous Drawings (3 sheets) Jan. 12, 1995.
Artistic License, Miscellaneous Documents (2 sheets Feb. 1995 and Apr. 1996).
Co-Pending U.S. Appl. No. 09/213,581, filed Dec. 17, 1998, entitled "Kinetic Illumination Systems and Methods," our File No. C01104/70049.
Website www.colorkinetics.com/products/controllers/index.htm, "Controllers fee the power. It's Herculean", downloaded Apr. 17, 2001.
Website www.colorkinetics.com/products/light/icolor/index.htm, "iColor Series iWant.iNeed.iHave to have", downloaded Apr. 17, 2001.
Website til.info.apple.com/techinfo.nsf/artnum/n58417, Tech Info Library-1 Book: How to Determine Battery Charge Status, downloaded Jun. 3, 2001.
Website www.cksauce.com/products/lightwand.htm, "LightWand" downloaded Jan. 28, 2002.
Website www.cksauce.com/products/minilightwand.htm "MiniLightWand" downloaded Jan. 28, 2002.
Website www.cksauce.com/products/lightwasher.htm "Lightwasher" downloaded Jan. 28, 2002.
Website www.cksauce.com/products/lightorb.htm "LightOrb" downloaded Jan. 28, 2002.
Website www.cksauce.com/products/lightsprite.htm "LightSprite" downloaded Jan. 28, 2002.
Website www.cksauce.com/products/lightsaucer.htm "LightSaucer" downloaded Jan. 28, 2002.
Website www.jtech.com/products/guest_alert.htm "GuestAlert Guest Paging Systems" downloaded Jan. 28, 2002.
Website www.2.consumer.philips.com/global/b2c/ce/catalog/product.jhtml?divId=O&groupID=TV downloaded Jan. 28, 2002.
Circuit City advertisement for Philips Somba 13" stereo TV, no date.
International Search Report for International Application No. PCT/US01/41438 (mailed Apr. 10, 2003).

* cited by examiner

*Primary Examiner*—Haissa Philogene
(74) *Attorney, Agent, or Firm*—Wolf, Greenfield & Sacks, P.C.

(57) ABSTRACT

A color-changing device which includes an enclosure at least a portion of which is material which is desired to change color. There is also included an illumination device, such as an LED or collection of LEDs which can illuminate the material. There can also be included a controller which can take some form of input, such as from a network, or a sensor, and can convert that input into a signal to control the illumination. There is also included a method for performing such color change.

68 Claims, 5 Drawing Sheets

SYSTEMS AND METHODS FOR COLOR CHANGING DEVICE AND ENCLOSURE

CROSS-REFERENCES TO RELATED APPLICATIONS

This application claims the benefit under 35 U.S.C. §120 as a continuation (CON) of U.S. Non-provisional application Ser. No. 09/917,246, filed Jul. 27, 2001, now U.S. Pat. No. 6,888,322 entitled "Systems and Methods for Color Changing Device and Enclosure."

Ser. No. 09/917,246 in turn claims the benefit under 35 U.S.C. §119(e) of U.S. Provisional Application Ser. No. 60/221,579 filed Jul. 28, 2000, entitled "Color Changing Device and Enclosure."

Ser. No. 09/917,246 also claims the benefit under 35 U.S.C. §120 as a continuation-in-part (CIP) of the following co-pending U.S. Non-provisional Applications:

Ser. No. 09/215,624, filed Dec. 17, 1998, entitled "Smart Light Bulb", now U.S. Pat. No. 6,528,954, which claims the benefit of the following provisional applications:

Ser. No. 60/071,281, filed Dec. 17, 1997, entitled "Digitally Controlled Light Emitting Diodes Systems and Methods";

Ser. No. 60/068,792, filed Dec. 24, 1997, entitled "Multi-Color Intelligent Lighting";

Ser. No. 60/078,861, filed Mar. 20, 1998, entitled "Digital Lighting Systems";

Ser. No. 60/079,285, filed Mar. 25, 1998, entitled "System and Method for Controlled Illumination"; and Serial No. 60/090,920, filed Jun. 26, 1998, entitled "Methods for Software Driven Generation of Multiple Simultaneous High Speed Pulse Width Modulated Signals."

Ser. No. 09/917,246 also claims the benefit under 35 U.S.C. §120 as a continuation-in-part (CIP) of the following co-pending U.S. Non-provisional Applications:

Ser. No. 09/213,607, filed Dec. 17, 1998 now abandoned, entitled "Systems and Methods for Sensor-Responsive Illumination";

Ser. No. 09/213,189, filed Dec. 17, 1998, entitled "Precision Illumination", now U.S. Pat. No. 6,459,919;

Ser. No. 09/213,581, filed Dec. 17, 1998 now U.S. Pat. No. 7,038,398, entitled "Kinetic Illumination";

Ser. No. 09/213,540, filed Dec. 17, 1998 now U.S. Pat. No. 6,720,745, entitled "Data Delivery Track";

Ser. No. 09/333,739, filed Jun. 15, 1999, entitled "Diffuse Illumination Systems and Methods";

Ser. No. 09/742,017, filed Dec. 20, 2000 now abandoned, entitled "Lighting Entertainment System", which is a continuation of U.S. Ser. No. 09/213,548, filed Dec. 17, 1998, now U.S. Pat. No. 6,166,496;

Ser. No. 09/815,418; filed Mar. 22, 2001 now U.S. Pat. No. 6,577,080, entitled "Lighting Entertainment System", which also is a continuation of U.S. Ser. No. 09/213,548, filed Dec. 17, 1998, now U.S. Pat. No. 6,166,496; and Ser. No. 09/626,905, filed Jul. 27, 2000 now U.S. Pat. No. 6,340,868, entitled "Lighting Components", which is a continuation of U.S. Ser. No. 09/213,659, filed Dec. 17, 1998, now U.S. Pat. No. 6,211,626.

Each of the foregoing applications is incorporated herein by reference.

This application also claims the benefit under 35 U.S.C. §120 as a continuation-in-part (CIP) of U.S. Non-provisional application Ser. No. 09/805,368, filed Mar. 13, 2001 now U.S. Pat. No. 7,186,003, entitled "Light-emitting Diode Based Products," which in turn claims the benefit of the following U.S. Provisional Applications:

Ser. No. 60/199,333, filed Apr. 24. 2000, entitled "Autonomous Color Changing Accessory;" and Ser. No. 60/211,417, filed Jun. 14. 2000, entitled "LED-based Consumer Products."

BACKGROUND OF THE INVENTION

1. Field of the Invention

The invention relates to systems and methods for the design of devices and enclosures, in particular for the design of enclosures that can change color.

2. Description of Related Art

Computers have recently been introduced where the computer enclosure is a color other than the conventional beige. These computers are offered in a variety of colors. The enclosures are formed of a semi-transparent plastic of a particular color, such as blue, red or green. The enclosures are slightly translucent to allow the user to see the internal components of the computer. The use of brightly and interestingly colored enclosures for various different types of devices is becoming more and more popular. Cellular phones can now have covers or button sets produced in a variety of different colors that can be transparent or semi-transparent or can be decorated with figures or symbols. Personal Digital Assistants (PDAs) have also recently been introduced that have a transparent or semi-transparent enclosure in a variety of colors.

A problem with these enclosures is that they only come in a static color. Once you have bought a blue computer you keep a blue computer unless you want to purchase a new enclosure in a different static color. This is an upgrade that can be expensive and require significant time to install. In addition, the color cannot easily change in response to computer states or digital information. A single enclosure capable of color changing would be desirable to eliminate the static color requirements of the present enclosure.

SUMMARY OF THE INVENTION

One embodiment of the present invention is a color-changing device. The color changing device may include an enclosure; a piece of material which is to be illuminated which makes up at least a portion of said enclosure; and an illumination device for illuminating said material.

Another embodiment of the present invention is directed to a method for changing the color of a device. The method involves the acts of providing a device; illuminating at least a portion of said device; and changing the color of said illumination.

A further embodiment of the present invention is directed to a method for changing the color of a device. The method involves the acts of generating an input signal; generating a control signal in response to the input signal; communicating the control signal to a lighting system; and arranging the lighting system to illuminate at least a portion of the device enclosure.

DETAILED DESCRIPTION

Figure 1:
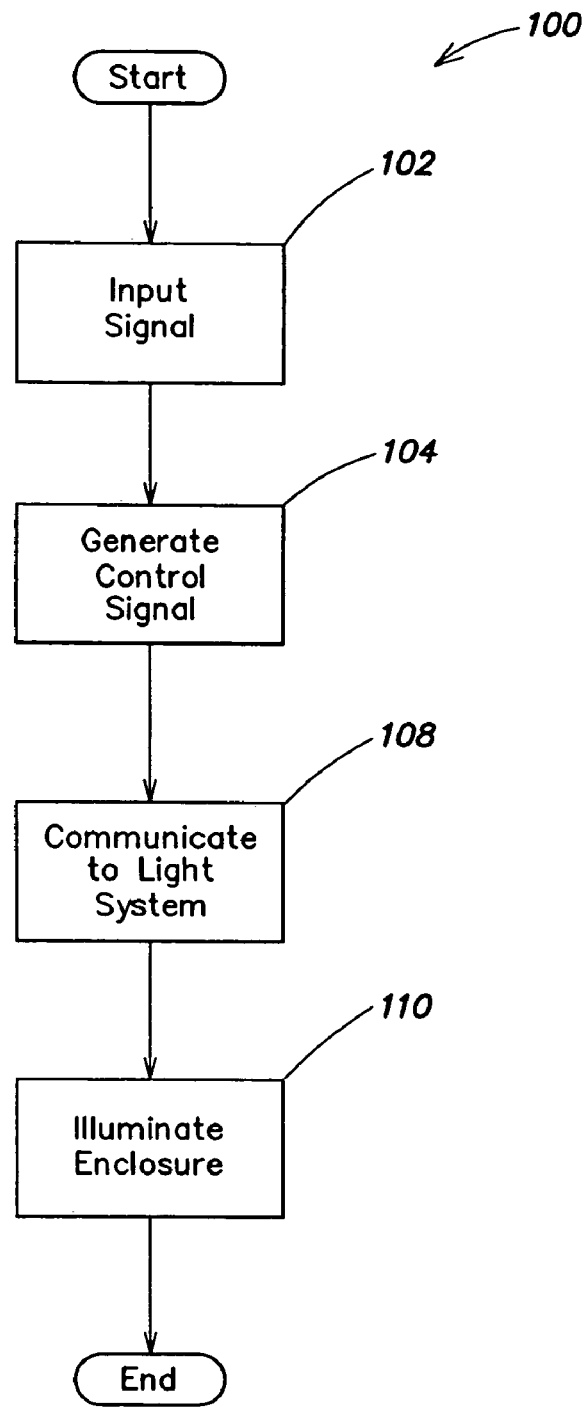
FIG. 1 is a flow diagram of a process according to one embodiment of the present invention.

In one embodiment of the invention an illumination system such as an LED system of one or more LEDs is arranged to edge light or backlight an enclosure to provide a colored enclosure or a color changing enclosure. One possible technology for implementing color changing illumination systems is described in U.S. Pat. No. 6,016,038, the disclosure of which is herein incorporated by reference. In addition, color changing illumination systems need not be LED based and in other embodiments of the invention the color changing illumination devices could comprise, but are not limited to, fiber optic strands, incandescent lighting, fluorescent lighting, or other solid-state technology such as Electro-luminescent (EL) or organic LED-based devices (OLED).

The enclosure could be an enclosure for any type of device such as, but not limited to; a desktop, laptop, server, hand-held, web-access, or any other type of computer, computer peripherals or accessories (such as, but not limited to, disk drive, mouse or other pointing device, printer, scanner, keyboard, cables, or modem) media players; DVD players and recorders; CD players and recorders; tape players and recorders; stereo receivers; self contained stereo systems; televisions; television remote controls or other peripherals; cable TV decoder boxes; projection systems; speakers and speaker systems; landline or wireless telephones; radio frequency (RF) transmission or communication devices; personal digital assistants (PDAs); toys; watches; appliances; refrigerators; stoves; ovens; dishwashers; trash compactors; hand held devices; or any other device or article with an enclosure.

The enclosure can be made of any transparent, semi-transparent, translucent or semi-translucent material, however, for ease of discussion, the material will be referred to as translucent to mean any of the above properties. The material can be entirely translucent or a portion of the material can be translucent. The LEDs can be arranged to edge light the enclosure such that a portion of the light couples to the enclosure edge and is transmitted through the material and/or a portion of the light is transmitted across the surface of the enclosure. Light traveling along the surface or through the material will be reflected off of or out of the material by imperfections in the material. These imperfections can be introduced deliberately or through inherent properties of the material. Making patterns of imperfections on or in the material can create surface lighting effects. The imperfections can also be applied to the entire surface to provide a glowing surface.

The LEDs can also be arranged to back light the enclosure or a surface behind the enclosure. Back lighting can achieve the same effects as edge lighting, or different effects could be achieved if a panel within the enclosure was backlit. The LEDs could be arranged to direct the emitted light at any direction at or near the enclosure to provide illumination of the enclosure. They could also be arranged to project patterns or symbols onto the enclosure. In one embodiment, the LEDs (or other lighting system) are disposed within the enclosure.

Figure 2:
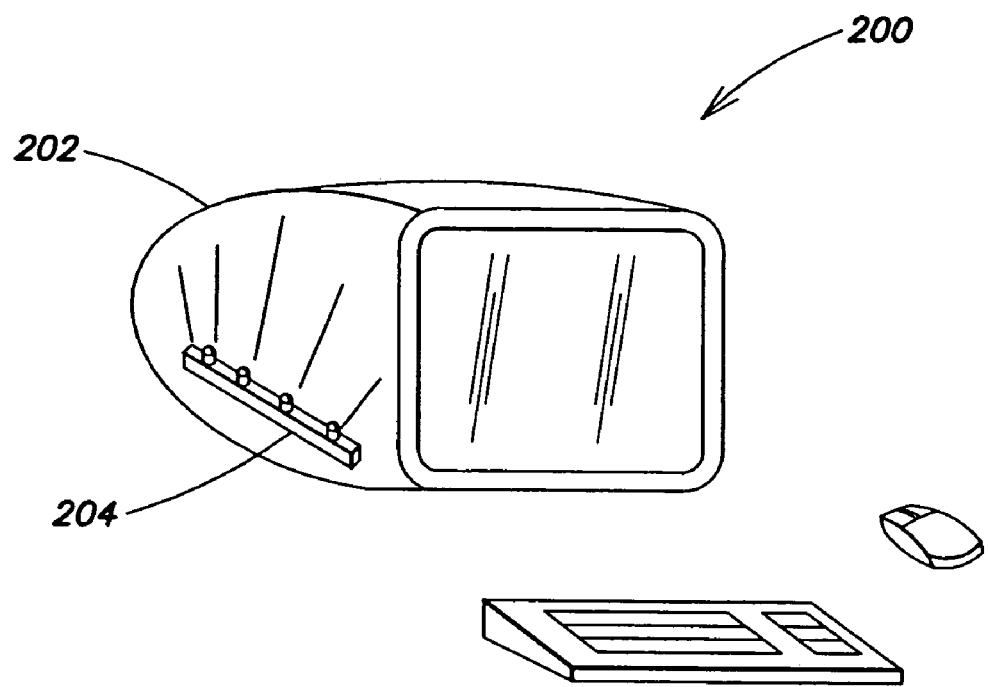
FIG. 2 illustrates a device with a lighted enclosure according to one embodiment of the present invention.

FIG. 2 illustrates a system according to the principles of the present invention. In this embodiment, the device 200 is a computer monitor with an enclosure 202. The system includes an illumination device 204 that is arranged to illuminate the enclosure or some portion thereof.

Figure 3:
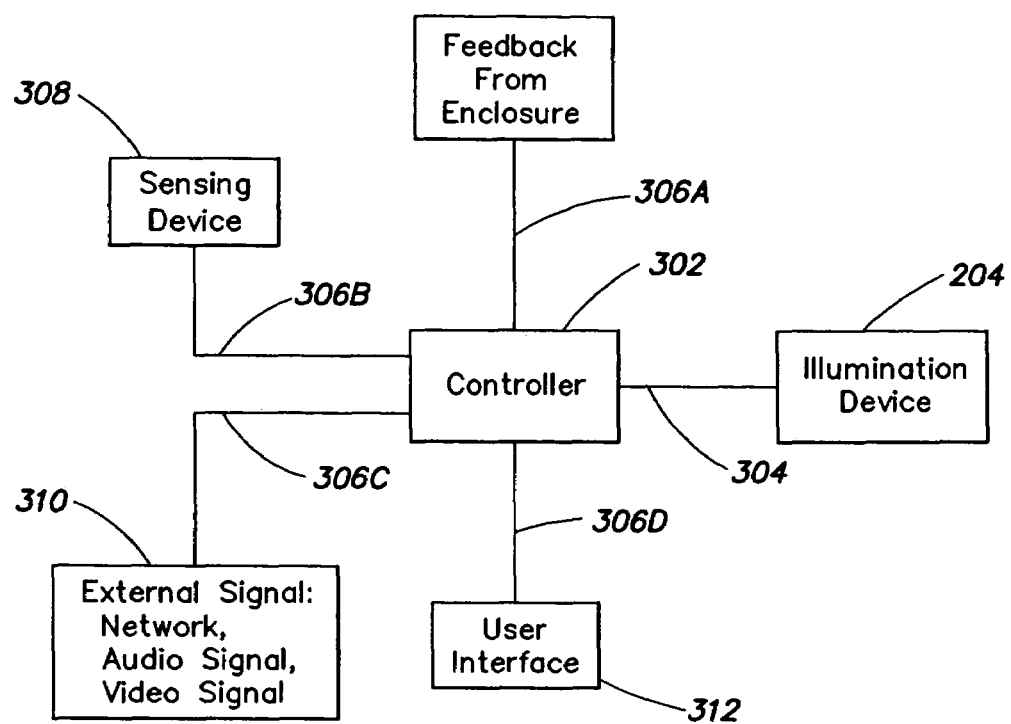
FIG. 3 illustrates various components of an illumination system according to one embodiment of the invention.

The illumination system can be controlled with a microprocessor or with passive circuitry. In an embodiment, the circuitry or microprocessor can provide a pulse width modulated signal or other control signals to drive the illumination system. Previously referenced U.S. Pat. No. 6,016,038 provides one possible method for doing this. As shown in FIG. 3, the circuitry or microprocessor may include a controller 302 to provide one or more control signals 304 based at least in part on one or more input signals 306A, 306B, 306C, and 306D from the enclosed device or one or more other devices (e.g., a sensing device 308, one or more external signal sources 310 that generate network or Internet signals, audio signals and/or video signals, and a user interface 312). The controller could be any type of software process, hardware, or separate device that can receive input signals from a switch, transducer, processor, sensor, or receiver either directly as a digital signal or an analog signal through an Analog/Digital converter. If at least two different colored illumination devices are used in the illumination system, they can be controlled through separate control signals, separate sensors, or separate controllers to provide a variety of colors to the enclosure.

One embodiment of the invention would be to use the color changing or lighted enclosure as a computer enclosure or a portion of the computer enclosure. The color changing effects could be controlled through the controller to correlate or respond to signals generated within the enclosed computer, from a computer network, or from another device. The enclosure may also change color on demand through external switching or transducers or could be controlled internal to the computer by user controlled software or hardware. With the former arrangement, the computer could change colors as the result of the computer receiving email or other information, or could change colors with regard to system activity, for instance a busy computer could be red while a ready computer was green. The enclosure could also change colors as a result of changing variables from a network. In one embodiment, it could change colors based on information received from the World Wide Web. For example, if stock prices fall according to a particular website or websites, the enclosure could turn red and if they go up the enclosure could change to blue. The system could also be used in conjunction with e-business or Internet advertising allowing an individual having a site or advertisement on the Internet to transmit colors they desired the enclosure to be. For example, Coca-Cola could turn a user's enclosure red (or even Coca Cola's specific shade of red) when the user views pages posted by Coca-Cola or when ads for Coca-Cola are presented to the user. Alternatively, the colors chosen could simply be determined to encourage the users purchase of certain types of products. For instance, red and yellow could be presented with food ads or pages as these colors are believed to promote purchases of food items.

In a still further embodiment, the system could be linked with an external sensing device to determine color. For instance, the device could be linked to a color sensor designed to detect the color of the device's surroundings and match, contrast, or otherwise select a color for the enclosure based on the surroundings. Alternatively, the device could be linked to a temperature, pressure, motion or other variable detection device so the device could function as an indicator of this variables current value.

Figure 4:
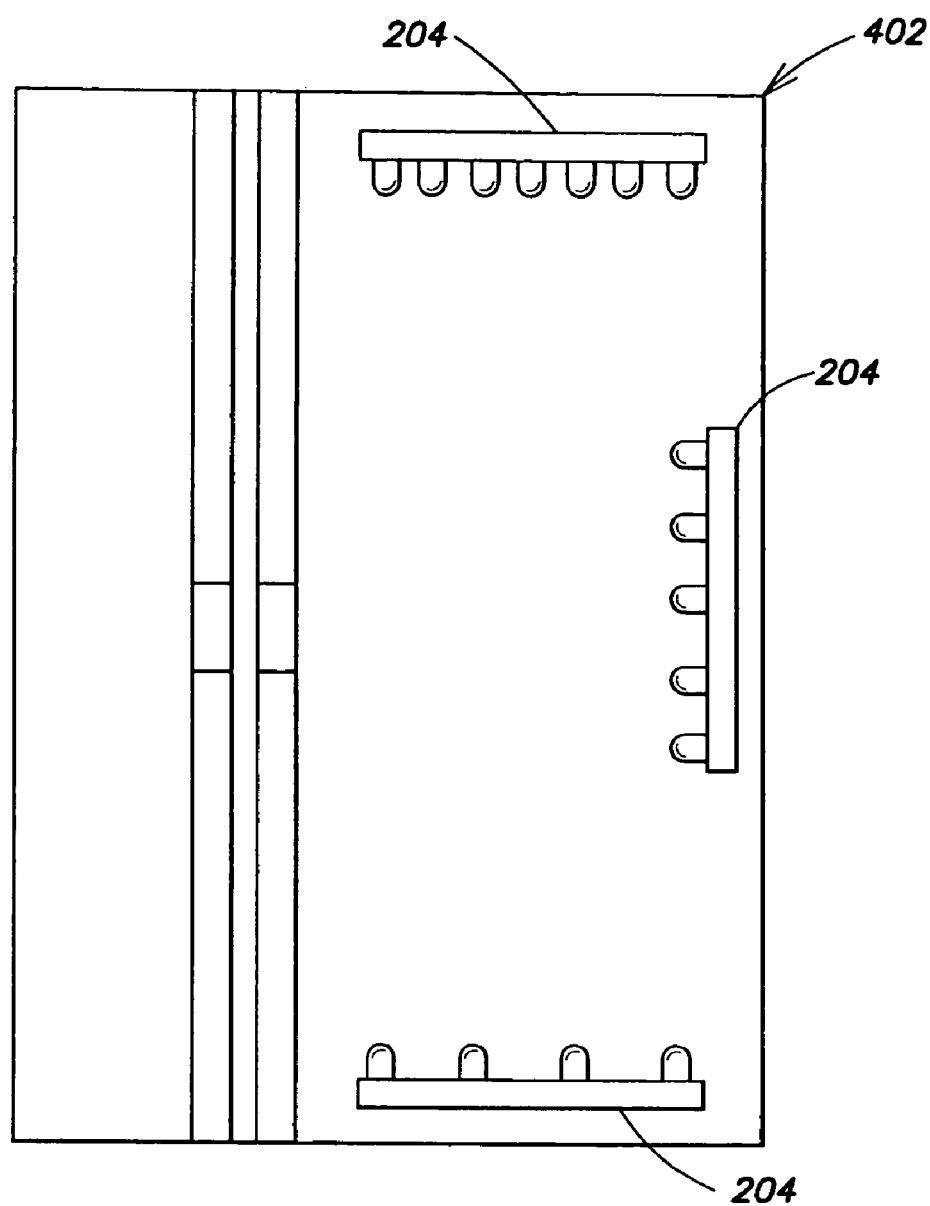
FIG. 4 illustrates a lighted refrigerator according to one embodiment of the invention.

Another embodiment of the invention as shown in FIG. 4 is directed to a refrigerator 402 where the front panel or portion of the front panel is lit and changes colors with response to the temperature inside the unit by employing a system similar to that shown in FIG. 3. The refrigerator panel could also be receiving external signals of outside temperature or stock prices as in the computer example, or provide colors to a dieter to either encourage or discourage eating at a particular time.

Another embodiment would be the entire enclosure or a portion of an enclosure of an audio speaker or television where the color changing is linked to the audio or video signal where the signal may be preconditioned to provide certain lighting effects associated with the signal.

Figure 2A:
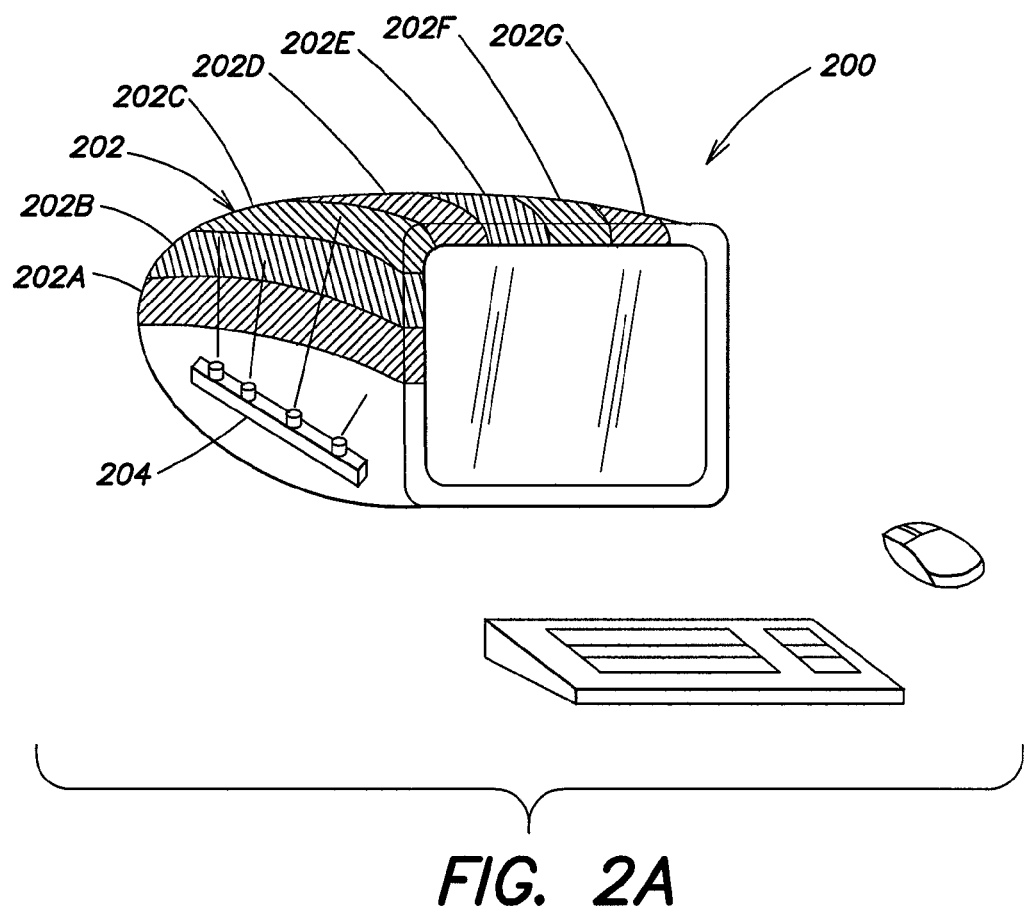
FIG. 2A illustrates a device with a lighted enclosure, in which multiple pieces of information are provided on different portions of the enclosure, according to one embodiment of the present invention.

Although the changing of color has been described here, it is also included within the scope of this disclosure that in one embodiment the system could vary color on a specific scale (as opposed to generic red or green, a specific shade of red could be produced) or any other characteristics of the light could be altered such as, but not limited to, intensity, saturation, hue. The system could also be programmed with patterns or schemes for regularly changing colors and any of the characteristics of those patterns such as, but not limited to, speed or repetition could also be controlled. In another embodiment as illustrated in FIG. 2A, multiple pieces of information could also be provided on different portions 202A-G of the enclosure 202 as different colors so, for example a computer enclosure could indicate that the stock market is falling, and your broker has sent you e-mail. In still another embodiment, the illumination of the device could be sufficient to actually provide a light source for a room or other area.

In another embodiment the illumination device could provide a constant color not designed to be changed.

FIG. 1 illustrates a process 100 according to one embodiment of the present invention. In this embodiment, an input signal may be generated at act 102. A control signal may be generated at act 104 in response to the input signal. The control signal 104 may then be communicated (in act 108) to a lighting system which then illuminates an enclosure (act 110).

The input signal 102 may be generated by any number of sources. For example, the input signal 102 may be generated by a user interface such as a button, switch, keyboard, mouse, software interface, graphical user interface, or other user interface, a sensor or transducer, or another source such as a database, network, World Wide Web, or other signal generator (e.g. email alert signal, financial data from the web). The input signal 102 may comprise a combination of signal generators. For example, the lighting system may be responding to financial data and a user interface may be used to adjust the settings of the illumination.

In one embodiment, the input signal 102 may be converted into a lighting control signal. For example, the input signal 102 may be generated and or encoded with information corresponding to its source. Upon receipt of such a signal, a system according to one embodiment of the invention may generate corresponding lighting control signals. The generator may analyze the input signal and find that it originated from a financial database, for example. The generator may then select or generate control signals based on this information. The generator may be a processor that selects lighting control signals from an associated memory, generates a control signal based on an algorithm, modifies a control signal or program, selects a table or generates control signals through other methods. It should be appreciated that there are a number of ways to generate lighting control signals and the present invention should not be limited to any particular method.

In one embodiment, the control signals 104 may be communicated to a light system 108 arranged to illuminate an enclosure or portion thereof. In one embodiment, the light system may include at least one LED. In another embodiment, the light system may include two or more LEDs of different colors, wherein at least one of the LEDs is controlled through the control signal in such a way as to change the color of the emitted light from the light system. The light system may include three different colored LEDs (e.g. red, green, and blue) wherein the three colors are independently controlled through the control signals such that the emitting light from the light system can be changed.

As used herein, the term "LED" should be understood to include light emitting diodes of all types, light emitting polymers, semiconductor dies that produce light in response to current, organic LEDs, electro-luminescent strips, and other such systems. "LED" may refer to a single light emitting diode having multiple semiconductor dies that are individually controlled. It should also be understood that the term "LED" does not restrict the package type of the LED. The term "LED" includes packaged LEDs, non-packaged LEDs, surface mount LEDs, chip on board LEDs and LEDs of all other configurations. The term "LED" also includes LEDs packaged or associated with material (e.g. a phosphor) wherein the material may convert energy from the LED to a different wavelength.

While the invention has been disclosed in connection with the preferred embodiments shown and described in detail, various modifications and improvements thereon will become readily apparent to those skilled in the art. Accordingly, the spirit and scope of the present invention falls within the scope of the following claims and their equivalents.

The invention claimed is:

1. A color-changing device, comprising:
an enclosure including at least a piece of material which is to be illuminated;
an illumination device, disposed within the enclosure, to illuminate said material, the illumination device capable of generating at least two colors; and
a controller configured to control the illumination device in response to information received over a network from an external source,
wherein the network includes the Internet, and wherein the controller is configured to control the illumination device based on the information received over the Internet.

2. The color-changing device of claim 1, wherein said color-changing device is a computer.

3. The color-changing device of claim 1, wherein said color-changing device includes one or more of the following: a disk drive, a mouse, a pointing device, a printer, a scanner, a keyboard, a cable, a modem, a media player, a DVD player, a DVD recorder, a CD player, a CD recorder, a tape player, a tape recorder, a stereo receiver, a self contained stereo system, a television, a television remote control, a television peripheral, a cable TV decoder box, a projection system, a speaker, a landline telephone, a wireless telephone, a radio frequency (RF) transmission device, an RF communication device, a personal digital assistants (PDA) a toy, a watch, an appliance, a refrigerator, a stove, an oven, a dishwasher, a trash compactor, and a hand-held device.

4. The color-changing device of claim 1, wherein said piece of material is at least one of transparent, semi-transparent and translucent.

5. The color-changing device of claim 1, wherein said piece of material contains imperfections.

6. The color-changing device of claim 1, wherein said illumination device includes an LED.

7. The color-changing device of claim 1, wherein said illumination device includes a plurality of differently colored LEDs.

8. The color-changing device of claim 1, wherein the illumination device is configured to project patterns or symbols on said enclosure.

9. The color-changing device of claim 1, wherein the controller receives the information from a user of the color-changing device.

10. The color-changing device of claim 1, wherein said controller is configured to control said illumination device so as to indicate representations of multiple pieces of received information on different portions of said enclosure.

11. The color-changing device of claim 1, wherein the network includes a wireless network.

12. The color-changing device of claim 11, wherein the illumination device includes at least one LED-based light source configured to generate the at least two colors.

13. The color-changing device of claim 1, wherein the illumination device includes at least one LED-based light source configured to generate the at least two colors.

14. The color-changing device of claim 1, wherein the external source includes at least one sensing device, and wherein the controller is configured to control the illumination device in response to at least one signal provided by the at least one sensing device.

15. The color-changing device of claim 14, wherein the illumination device includes at least one LED-based light source configured to generate the at least two colors.

16. A method of changing the color of a device, the method comprising acts of:
   receiving an input signal over a network from an external source;
   generating a control signal in response to the input signal; and
   illuminating at least a portion of the device with variable colored light, in response to the control signal,
   wherein the act of receiving the input signal includes an act of receiving the input signal from the Internet.

17. The method of claim 16, wherein the act of illuminating includes an act of controlling at least one LED-based light source so as to generate the variable colored light.

18. The method of claim 16, wherein the act of receiving the input signal is accomplished though at least one of a sensor and a transducer.

19. The method of claim 16, wherein the act of receiving the input signal is accomplished though a user interface.

20. The method of claim 16, wherein the network is a wireless network.

21. The method of claim 19, wherein the user interface is at least one of a switch, dial, button, key, and keyboard.

22. The method of claim 19, wherein the user interface is a graphical user interface.

23. A computer system having a first housing for enclosing at least one component of the computer system, and a second housing for enclosing a second component of the computer system, the first housing having a first light passing wall, the second housing having a second light passing wall, the computer system comprising:
   a light source disposed inside the housing, the light source being configured to generate light;
   a second light source disposed inside the second housing, the second light source being configured to generate light; and
   a light controller operatively coupled to the light source, the light source controller being configured to control the light source so as to illuminate at least a portion of the light passing wall of the housing with the light generated by the light source, the light source being dedicated to illuminating the light passing wall.

24. A computer system having a housing for enclosing at least one component of the computer system, the housing having a light passing wall, the computer system comprising:
   a light source disposed inside the housing, the light source being configured to generate light; and
   a light controller operatively coupled to the light source, the light source controller being configured to control the light source so as to illuminate at least a portion of the light passing wall of the housing with the light generated by the light source to significantly alter an ornamental appearance of the light passing wall, the light source being dedicated to illuminating the light passing wall, and
   wherein the housing further includes one or more opaque walls that cooperate with the one or more light passing walls to define the shape of the housing.

25. A general purpose computer, comprising:
   a housing including one or more walls that define the outer peripheral form of the general purpose computer, one of the walls having an illuminable portion configured to allow the passage of light therein;
   a controllable light emitting device enclosed by the housing, the light emitting device being configured to produce an adjustable light effect for colorizing or patternizing the illuminable portion to significantly alter an ornamental appearance of the illuminable portion; and
   a processor enclosed by the housing, the processor being configured to at least partially control the operations of the general purpose computer.

26. A display for use with a general purpose computer, comprising
   a housing including one or more walls that define the outer peripheral form of the display, one of the walls having an illuminable portion configured to allow the passage of light therein;
   a controllable light arrangement enclosed by the housing, the light arrangement being configured to produce an adjustable light effect for colorizing or patternizing the illuminable portion; and
   a display screen partially enclosed by the housing, the display screen being configured to display text or graphics via a graphical user interface.

27. A color-changing device, comprising:
   an enclosure including at least a piece of material which is to be illuminated;
   an illumination device, disposed within the enclosure, to illuminate said material, the illumination device capable of generating at least two colors; and
   a controller configured to control the illumination device in response to information received over a network from an external source,
   wherein the information includes at least one email message, and wherein the controller is configured to control the illumination device based on the at least one email message.

28. The color-changing device of claim 27, wherein the illumination device includes at least one LED-based light source configured to generate the at least two colors.

29. A color-changing device, comprising:
an enclosure including at least a piece of material which is to be illuminated;
an illumination device, disposed within the enclosure, to illuminate said material, the illumination device capable of generating at least two colors; and
a controller configured to control the illumination device in response to information received over a network from an external source,
wherein the information includes advertising information, and wherein the controller is configured to control the illumination device based on the advertising information.

30. The color-changing device of claim 29, wherein the illumination device includes at least one LED-based light source configured to generate the at least two colors.

31. A color-changing device, comprising:
an enclosure including at least a piece of material which is to be illuminated;
an illumination device, disposed within the enclosure, to illuminate said material, the illumination device capable of generating at least two colors; and
a controller configured to control the illumination device in response to information received over a network from an external source,
wherein the information includes economic information, and wherein the controller is configured to control the illumination device based on the economic information.

32. The color-changing device of claim 31, wherein the illumination device includes at least one LED-based light source configured to generate the at least two colors.

33. A method for changing the color of an enclosure, the method comprising acts of:
receiving information over a network from an external source; and
illuminating at least a portion of said enclosure with at least two colors, in response to the information,
wherein the network includes the Internet.

34. The method of claim 33, wherein, said act of illuminating is performed by at least one LED.

35. The method of claim 34, wherein the act of illuminating includes an act of controlling a plurality of differently colored LEDs, in response to the information, to generate the at least two colors.

36. The method of claim 33, wherein the external source includes at least one sensing device.

37. The method of claim 33, wherein the act of illuminating includes an act of controlling at least one of at least two LEDs so as to vary the at least two colors in response to the information.

38. The method of claim 33, wherein the network includes a wireless network.

39. A method for changing the color of an enclosure, the method comprising acts of:
receiving information over a network from an external source; and
illuminating at least a portion of said enclosure with at least two colors, in response to the information,
wherein the act of receiving information includes an act of receiving at least one email message.

40. A method for changing the color of an enclosure, the method comprising acts of:
receiving information over a network from an external source; and
illuminating at least a portion of said enclosure with at least two colors, in response to the information,
wherein the act of receiving information includes an act of receiving advertising information.

41. A method for changing the color of an enclosure, the method comprising acts of:
receiving information over a network from an external source; and
illuminating at least a portion of said enclosure with at least two colors, in response to the information,
wherein the act of receiving information includes an act of receiving economic information.

42. An apparatus comprising:
a surface including at least a piece of material which is to be illuminated;
an illumination device, disposed proximate to the surface, to illuminate said material, the illumination device capable of generating at least two colors; and
a controller configured to control the illumination device in response to information received from the Internet, wherein the information includes at least one email message, and wherein the controller is configured to control the illumination device based on the at least one email message.

43. The apparatus of claim 42, wherein the illumination device includes at least one LED-based light source.

44. The apparatus of claim 42, wherein the at least one LED-based light source includes at least two LEDs capable of generating the at least two colors.

45. The apparatus of claim 42, wherein the surface forms part of an enclosure.

46. The apparatus of claim 42, wherein the illumination device is disposed within the enclosure.

47. An apparatus comprising:
a surface including at least a piece of material which is to be illuminated;
an illumination device, disposed proximate to the surface, to illuminate said material, the illumination device capable of generating at least two colors; and
a controller configured to control the illumination device in response to information received from the Internet, wherein the information includes advertising information, and wherein the controller is configured to control the illumination device based on the advertising information.

48. An apparatus comprising:
a surface including at least a piece of material which is to be illuminated;
an illumination device, disposed proximate to the surface, to illuminate said material, the illumination device capable of generating at least two colors; and
a controller configured to control the illumination device in response to information received from the Internet, wherein the information includes economic information, and wherein the controller is configured to control the illumination device based on the economic information.

49. A computer system having a housing for enclosing at least one component of the computer system, the housing having a light passing wall, the computer system comprising:
a light source disposed inside the housing, the light source being configured to generate light;

a light controller operatively coupled to the light source, the light source controller being configured to control the light source so as to illuminate at least a portion of the light passing wall of the housing with the light generated by the light source, the light source being dedicated to illuminating the light passing wall;

a processor configured to carry out operations associated with the computer system, the processor being operatively coupled to the light source controller;

a display;

a display controller operatively coupled to the processor and the display, the display controller being configured to process display commands to produce text or graphics on the display; and an input/output controller operatively coupled to the processor, the input/output controller being configured to control interactions with one or more input/output devices that can be operatively coupled to the computer system.

50. A computing device, comprising:

an illuminable housing capable of being illuminated by light, the housing being configured to enclose internal components associated with the operation of the computing device; and a controllable light emitting device disposed inside the illuminable housing, the light emitting device being configured to produce an adjustable light effect for colorizing or patternizing the illuminable housing in order to significantly alter the ornamental appearance of the housing of the computing device, the light emitting device including a light source configured to generate the light so as to illuminate the interior of the illuminable housing, the light illuminating an inner surface of a housing wall to effect an appearance change in an outer surface of the housing wall.

51. A computing device, comprising:

an illuminable housing capable of being illuminated by light, the housing being configured to enclose internal components associated with the operation of the computing device; and a controllable light emitting device disposed inside the illuminable housing, the light emitting device being configured to produce an adjustable light effect for colorizing or patternizing the illuminable housing in order to significantly alter the ornamental appearance of the housing of the computing device, the light emitting device including a light source configured to generate the light so as to illuminate the interior of the illuminable housing, the light illuminating an inner edge of a housing wall to effect an appearance change in an outer edge of the housing wall.

52. A general purpose computer, comprising:

an illuminable housing capable of being illuminated by light; and a controllable light emitting device disposed inside the illuminable housing, the light emitting device being configured to produce an adjustable light effect for colorizing or patternizing the illuminable housing in order to significantly alter the ornamental appearance of the housing of the general purpose computer.

53. A computer system having a housing for enclosing at least one component of the computer system, the housing having a light passing wall, the computer system comprising:

a light source disposed inside the housing, the light source being configured to generate light, the light source not being a display; and a light controller operatively coupled to the light source, the light source controller being configured to control the light source so as to illuminate at least a portion of the light passing wall of the housing with the light generated by the light source to significantly alter an ornamental appearance of the light passing wall, the light source being dedicated to illuminating the light passing wall.

54. A computer system having a housing for enclosing at least one component of the computer system, the housing having a light passing wall, the computer system comprising:

a light source disposed inside the housing, the light source being configured to generate light; and a light controller disposed inside the housing and operatively coupled to the light source, the light source controller being configured to control the light source so as to illuminate at least a portion of the light passing wall of the housing with the light generated by the light source to significantly alter an ornamental appearance of the light passing wall, the light source being dedicated to illuminating the light passing wall.

55. A computer system having a housing for enclosing at least one component of the computer system, the housing having a light passing wall, the computer system comprising:

a light source disposed inside the housing, the light source being configured to generate light;

a light controller operatively coupled to the light source, the light source controller being configured to control the light source so as to illuminate at least a portion of the light passing wall of the housing with the light generated by the light source to significantly alter an ornamental appearance of the light passing wall, the light source being dedicated to illuminating the light passing wall; and a processor being operatively coupled to the light source controller.

56. A computer system having a housing for enclosing at least one component of the computer system, the housing having a light passing wall, the computer system comprising:

a light source disposed inside the housing, the light source being configured to generate light;

a light controller operatively coupled to the light source, the light source controller being configured to control the light source so as to illuminate at least a portion of the light passing wall of the housing with the light generated by the light source to significantly alter an ornamental appearance of the light passing wall, the light source being dedicated to illuminating the light passing wall;

a display; and a display controller configured to process display commands to produce text or graphics on the display.

57. A computer system having a housing for enclosing at least one component of the computer system, the housing having a light passing wall, the computer system comprising:

a light source disposed inside the housing, the light source being configured to generate light;

a light controller operatively coupled to the light source, the light source controller being configured to control the light source so as to illuminate at least a portion of the light passing wall of the housing with the light generated by the light source to significantly alter an ornamental appearance of the light passing wall, the light source being dedicated to illuminating the light passing wall; and an input/output controller configured to control interactions with one or more input/output devices that can be operatively coupled to the computer system.

58. A color-changing device, comprising:

an enclosure including at least a piece of material which is to be illuminated; and an illumination device, disposed within the enclosure, to illuminate said material, the illumination device capable of generating at least two colors, wherein the illumination device is configured to illuminate the material based at least in part on at least one email message.

59. The color-changing device of claim 58, wherein said device is a computer.

60. A computing device comprising an enclosure having an illuminable wall in optical communication with a light source disposed inside the enclosure, and a control means for varying a characteristic or attribute of the light generated by the light source, said illuminable wall and said light source working together to emit a characteristic glow at a peripheral portion of said enclosure to significantly alter an ornamental appearance of the enclosure.

61. The computing device of claim 60, wherein the illuminable wall includes a light directing element configured to scatter light from the light source, the scattered light helping to form the characteristic glow.

62. The computing device of claim 61, wherein the light directing element is an additive disposed inside the illuminable wall.

63. The computing device of claim 61, wherein the light directing element is a coating applied to the illuminable wall.

64. The computing device of claim 61, wherein the light directing element is a textured surface of the illuminable wall.

65. The computing device of claim 60, wherein the characteristic glow is formed at an outer surface of the illuminable wall.

66. The computing device of claim 60, wherein the illuminable wall helps to structurally support the internal components of the computing device in their assembled position within the enclosure and wherein the illuminable wall is formed from a translucent or semi translucent material.

67. The computing device of claim 60, wherein the enclosure defines the outer peripheral form of the computing device.

68. The computing device of claim 60, wherein the characteristic glow is formed at an outer edge of the illuminable wall.

* * * * *

UNITED STATES PATENT AND TRADEMARK OFFICE
CERTIFICATE OF CORRECTION

PATENT NO. : 7,248,239 B2
APPLICATION NO. : 10/913144
DATED : July 24, 2007
INVENTOR(S) : Kevin J. Dowling et al.

It is certified that error appears in the above-identified patent and that said Letters Patent is hereby corrected as shown below:

Title Page, item (63) should read as following: Continuation of application No. 09/917,246, filed on Jul. 27, 2001, now Pat. No. 6,888,322, which is a continuation-in-part of application No. 09/215,624, filed on Dec. 17, 1998, now Pat. No. 6,528,954, and a continuation-in-part of application No. 09/742,017, filed on Dec. 20, 2000, now abandoned, which is a continuation of application No. 09/213,548, filed on Dec. 17, 1998, now Pat. No. 6,166,496. Said application No. 09/917,246 is a continuation-in-part of application No. 09/333,739, filed on Jun. 15, 1999, and a continuation-in-part of application No. 09/213,607, filed on Dec. 17, 1998, now abandoned, and a continuation-in-part of application No. 09/213,189, filed on Dec. 17, 1998, now Pat. No. 6,459,919, and a continuation-in-part of application No. 09/213,581, filed on Dec. 17, 1998, now Pat. No. 7,038,398, and a continuation-in-part of application No. 09/213,540, filed on Dec. 17, 1998, now Pat. No. 6,720,745, and a continuation-in-part of application No. 09/815,418, filed on Mar. 22, 2001, now Pat. No. 6,577,080, and a continuation-in-part of application No. 09/626,905, filed on Jul. 27, 2000, now Pat. No. 6,340,868, which is a continuation of application No. 09/213,659, filed on Dec. 17, 1998, now Pat. No. 6,211,626, application No. 10/913,144 is a continuation-in-part of application No. 09/805,368, filed on Mar. 13, 2001, now Pat. No. 7,186,003.

Signed and Sealed this

Fourth Day of March, 2008

JON W. DUDAS
*Director of the United States Patent and Trademark Office*